J. M. HOPKINS.
Liquid-Measuring Apparatus.

No. 165,447. Patented July 13, 1875.

WITNESSES
J. Wm. Garner
Wm. B. Uppermann

INVENTOR
J. M. Hopkins
per
F. A. Lehmann
Attorney

UNITED STATES PATENT OFFICE.

JAMES M. HOPKINS, OF LOUISVILLE, KENTUCKY.

IMPROVEMENT IN LIQUID-MEASURING APPARATUS.

Specification forming part of Letters Patent No. 165,447, dated July 13, 1875; application filed June 25, 1875.

*To all whom it may concern:*

Be it known that I, JAMES M. HOPKINS, of Louisville, in the county of Jefferson and State of Kentucky, have invented certain new and useful Improvements in Device for Measuring Liquids; and I do hereby declare the following to be a full, clear, and exact description of the invention, such as will enable others skilled in the art to which it pertains to make and use it, reference being had to the accompanying drawings, which form a part of this specification.

My invention relates to an improved apparatus for measuring liquids; and it consists in the arrangement and combination of devices that will be more fully described hereinafter.

Figure 1:
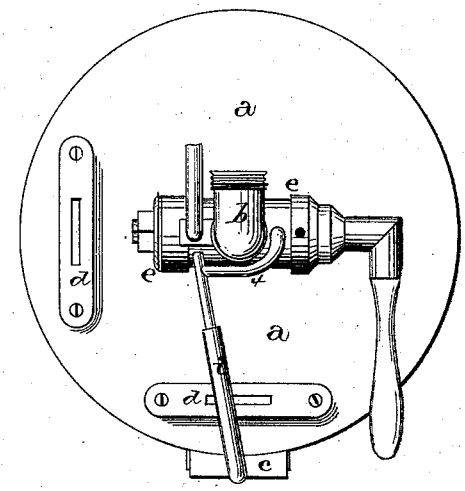
Figure 3:
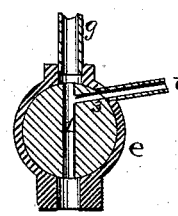
Figure 2:
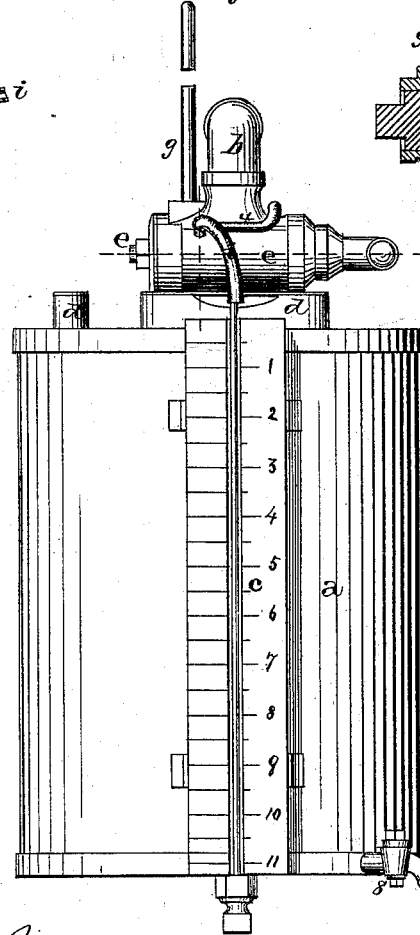
Figure 4:
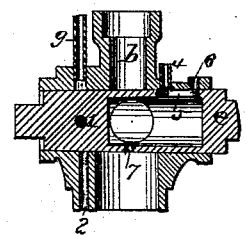

Figure 1 is a plan view of my invention. Fig. 2 is a side elevation of the same. Figs. 3 4 are detail views of the same.

$a$ represents a tank, of any desired capacity, that is placed a few inches, or many feet, below the main reservoir, with which it is connected by any suitable pipe or coupling, $b$. This tank is provided with a suitable gage, $c$, that indicates both the amount in the tank and the amount that has been drawn off—the figures being made to read both up and down. Upon the top of the tank are placed two levels, $d$, that are permanently secured in position, so as not to be tampered with, and which are placed at right angles to each other, so as to indicate the slightest unevenness in the tank. If the tank is tilted in the slightest in any direction, the amount of fluid that the gage will indicate as drawn off is varied at once, and gives an opportunity for fraud. By placing these levels at right angles to each other the slightest irregularity will be noticed at once.

In the connecting-pipe $b$, just above the tank, is placed a cock, $e$, for controlling the flow of liquid into the tank. Extending down through the shell of the cock, and the smaller end of the plug, is an opening, 1, which, when the plug is so turned as to allow the fluid to flow from the reservoir into the tank, registers with the hole 2 in the bottom of the shell, so that all of the air that is displaced by the inflowing fluid may pass up through these holes, and through the pipe $g$, and escape.

As a great deal of froth and and foam are carried up by the ascending air into this pipe, that would otherwise be lost, the upper end of the pipe is carried up above the top of the tank, and bent over it, so that all the froth and foam will be discharged into the reservoir.

As the liquid rises in the index-tube, the air in the tube escapes through the pipe or connection $i$, through the small hole 3 in the plug, into the hole 1, and up the long bent pipe $g$. When the plug is turned so as to shut off the flow of the liquid into the tank, the pipes $g$ $i$ are both closed.

Leading from the pipe $i$ is another small pipe, 4, that extends along the outside of the shell, and connects with an elongated hole, 5, in the plug. Through the shell, just near the end of the pipe 4, is a small air-hole, 6, that also connects with the hole 5 in the plug. This hole 5 opens into the plug, on the opposite side of which plug is made a small air-hole, 7, that communicates with the tank $a$. When the plug is turned so as to shut off the flow of liquid, and the cock 8 is turned so as to draw it out of the tank, the air-hole 6 admits air both into the tank and into the gage-tube, so as to allow the fluid to flow freely out.

Where the main reservoir is placed at any distance above the tank there will be as much if not more than a quart carried by the air into the tube $g$. When the plug is closed to stop the inflow of liquid, the plug also prevents the liquid in this pipe from flowing back into the tank as the liquid is being drawn off, which, if not done, would vary the correct measure, and cost the manufacturer just so much liquid.

Having thus described my invention, I claim—

1. A cock that is provided with an opening to permit an inflow of liquid into the tank $a$, and an air-hole to permit the air to escape from the tank, and an air-hole to permit the air to escape from the gage-tube, substantially as shown.

2. In a measuring apparatus, a cock, provided with an air-hole for admitting air into the tank as the liquor is drawn off, and an air-hole for admitting air to the gage-tube, substantially as described.

In testimony that I claim the foregoing I have hereunto set my hand this 24th day of June, 1875.

JAMES M. HOPKINS.

Witnesses:
F. A. LEHMANN,
JNO. D. PATTEN.